United States Patent
Dalsgaard et al.

(10) Patent No.: US 9,503,946 B2
(45) Date of Patent: Nov. 22, 2016

(54) USER EQUIPMENT MOBILITY IN NETWORKS INCLUDING SMALL CELLS

(71) Applicant: Nokia Corporation, Espoo (FI)

(72) Inventors: Lars Dalsgaard, Oulu (FI); Mikko Saily, Helsinki (FI);
(Continued)

(73) Assignee: NOKIA CORPORATION, Espoo (FI)

( * ) Notice: Subject to any disclaimer, the term of this patent is extended or adjusted under 35 U.S.C. 154(b) by 87 days.

(21) Appl. No.: 14/382,888

(22) PCT Filed: Feb. 26, 2013

(86) PCT No.: PCT/FI2013/050211
§ 371 (c)(1),
(2) Date: Sep. 4, 2014

(87) PCT Pub. No.: WO2013/140026
PCT Pub. Date: Sep. 26, 2013

(65) Prior Publication Data
US 2015/0038151 A1 Feb. 5, 2015

Related U.S. Application Data

(60) Provisional application No. 61/612,865, filed on Mar. 19, 2012.

(51) Int. Cl.
*H04W 36/00* (2009.01)

(52) U.S. Cl.
CPC ..... *H04W 36/0083* (2013.01); *H04W 36/0055* (2013.01)

(58) Field of Classification Search
CPC ............... H04W 36/0083; H04W 36/0055; H04W 52/44; H04W 36/30; H04W 36/04; H04B 17/382
See application file for complete search history.

(56) References Cited

U.S. PATENT DOCUMENTS

| | | | |
|---|---|---|---|
| 2007/0129017 A1* | 6/2007 | Dalsgaard | H04W 52/44 455/67.11 |
| 2007/0191013 A1* | 8/2007 | Gunnarsson | H04W 36/04 455/438 |
| 2011/0021201 A1 | 1/2011 | Lee et al. | |

FOREIGN PATENT DOCUMENTS

| | | |
|---|---|---|
| EP | 2426980 A1 | 3/2012 |
| WO | 2005096657 A1 | 10/2005 |

(Continued)

OTHER PUBLICATIONS

"UE MSE and HetNet Mobility", 3GPP TSG-RAN WG2 Meeting #77, R2-120524, Agenda item: 7.10.4, Feb. 6-10, 2012, 7 pages.

(Continued)

*Primary Examiner* — William Nealon
(74) *Attorney, Agent, or Firm* — Squire Patton Boggs (US) LLP (57) ABSTRACT

Methods and apparatus, including computer program products, are provided for mobility estimation in networks including small cells. In one aspect there is provided a method. The method may include receiving, at a user equipment, at least one of a first time value and a second time value, the first time value being configured for use towards a small cell and configured to have a duration to inhibit a hand over of the user equipment to the small cell, the second time value being configured for use towards a macro cell; and sending, by the user equipment, a measurement report including information representative of at least one of the small cell and the macro cell, the sending being delayed by the first time value, when the user equipment is evaluating the small cell, and by the second time value, when the user equipment is evaluating the macro cell. Related apparatus, systems, methods, and articles are also described.

18 Claims, 7 Drawing Sheets

(72) Inventors: Per Henrik Michaelsen, Aalborg (DK);
Simone Barbera, Aalborg (DK)

(56) References Cited

FOREIGN PATENT DOCUMENTS

| WO | 2007004956 A1 | 1/2007 |
|---|---|---|
| WO | 2013020517 A1 | 2/2013 |
| WO | 2013024349 A2 | 2/2013 |
| WO | 2013/045748 A1 | 4/2013 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331, V10.4.0, Dec. 2011, 296 pages.

"3rd Generation Partnership Project; Technical Specification Group Radio Access Network; Evolved Universal Terrestrial Radio Access (E-UTRA); User Equipment (UE) procedures in idle mode (Release 10)", 3GPP TS 36.304, V10.4.0, Dec. 2011, pp. 1-33.

"3rd Generation Partnership Project; Technical Specification Group Radio Access Network; Evolved Universal Terrestrial Radio Access (E-UTRA); LTE physical layer; General description (Release 11)", 3GPP TS 36.201, V11.1.0, Dec. 2012, pp. 1-13.

"3rd Generation Partnership Project; Technical Specification Group Radio Access Network; Evolved Universal Terrestrial Radio Access (E-UTRA); Physical channels and modulation (Release 12)", 3GPP TS 36.211, V12.0.0, Dec. 2013, pp. 1-120.

"3rd Generation Partnership Project; Technical Specification Group Radio Access Network; Evolved Universal Terrestrial Radio Access (E-UTRA); Multiplexing and channel coding (Release 12)", 3GPP TS 36.212, V12.1.0, Jun. 2014, pp. 1-89.

"3rd Generation Partnership Project; Technical Specification Group Radio Access Network; Evolved Universal Terrestrial Radio Access (E-UTRA); Physical layer procedures (Release 12)", 3GPP TS 36.213, V12.2.0, Jun. 2014, pp. 1-207.

"3rd Generation Partnership Project; Technical Specification Group Radio Access Network; Evolved Universal Terrestrial Radio Access (E-UTRA); Physical layer; Measurements (Release 11)", 3GPP TS 36.214, V11.1.0, Dec. 2012, pp. 1-14.

Office action received for corresponding Vietnam Patent Application No. 1-2014-03152, dated Jan. 27, 2015, 1 pages.

International Search Report and Written Opinion received for corresponding Patent Cooperation Treaty Application No. PCT/FI2013/050211, dated Jun. 13, 2013, 17 pages.

Extended European Search Report dated Nov. 20, 2015, issued in corresponding EP Application No. 13764893.7.

Meditek: "TTT configuration for HetNet mobility", 3GPP Draft, R2-120822_TTT Configuration for HetNet Mobility V4, 3rd Generation Partnership Project (3GPP), Mobile Competence Centre; 650, Route des Lucioles; F-06921 Sophia-Antipolis Cedex; France, vol. RAN WG2 (Feb. 6, 2012).

Himke Van Der Velde: "Control Plane Protocols" In: "LTE—The UMTS Long Term Evolution", Feb. 20, 2009, John Wiley & Sons, Ltd., Chichester, UK, XP055044888.

* cited by examiner

USER EQUIPMENT MOBILITY IN NETWORKS INCLUDING SMALL CELLS

RELATED APPLICATION

This application was originally filed as Patent Cooperation Treaty Application No. PCT/FI2013/050211 filed Feb. 26, 2013 which claims priority benefit to U.S. Provisional Patent Application No. 61/612865, filed Mar. 19, 2012.

FIELD

The subject matter described herein relates to wireless communications.

BACKGROUND

A femto cell base station is a cellular base station configured for a small cell, or coverage area, examples of which include a residence, a small business, a building, or a small area. As such, the femtocell base station, such as for example a home base station (HNB) or a home E-UTRAN (evolved Universal Mobile Telecommunications System Terrestrial Radio Access Network) Node B base station (HeNB), may have functionality similar to a typical base station, such as an E-UTRAN Node B (eNB) base station, but the femtocell base station may have less range and power given its limited coverage area. For example, the femtocell base station may have power sufficient for a cell serving wireless devices within a limited range of about tens of meters.

Pico cell base stations are another example of a small cell base station, but pico cell base stations have somewhat greater range serving a small area on the order of about 100-200 meters. Accordingly, wireless service providers view the femto cell base station and the pico cell base station as a way to extend service coverage into a small cell, as a way to offload traffic to the femto cell/pico cell base station, and/or as a way to provide enhanced service, such as higher data rates and the like, within the small cell, when compared to the larger macro cell served by a typical base station, such as the eNB base station.

A user equipment may determine its mobility state, such as whether the user equipment moves at a high, medium, or other rate. The mobility state for a given user equipment may be determined in order to adjust various values associated with, for example, hand over, cell re-selection, and the like. For example, a user equipment that is highly mobile may move through a cell at a high rate of speed. This high mobility may impact the service provided to the user equipment with respect to the re-selection of cells (when the user equipment is in an idle mode) and hand over (when the user equipment is in a connected state). For example, if the highly mobile user equipment uses one or more values which are the same as those used for a less mobile user equipment, the network may command a hand over to a cell which no longer serves the highly mobile user equipment. Indeed, these concerns are only exacerbated in so-called heterogeneous networks that include macro cells, pico cells, femto cells, or a combination thereof.

SUMMARY

Methods and apparatus, including computer program products, are provided for mobility in networks including small cells.

In one aspect there is provided a method. The method may include receiving, at a user equipment, at least one of a first time value and a second time value, the first time value being configured for use towards a small cell and configured to have a duration to inhibit a hand over of the user equipment to the small cell, the second time value being configured for use towards a macro cell; and sending, by the user equipment, a measurement report including information representative of at least one of the small cell and the macro cell, the sending being delayed by the first time value, when the user equipment is evaluating the small cell, and by the second time value, when the user equipment is evaluating the macro cell.

In one aspect there is provided a method. The method may include receiving, at a user equipment, at least a parameter provided by the network to configure mobility state estimation performed by the user equipment; determining, based on the received parameter, a value representative of a quantity of cell changes used in the mobility state estimation performed by the user equipment; and establishing the mobility state of the user equipment based on the determined value.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF DRAWINGS

In the drawings.

Like labels are used to refer to same or similar items in the drawings.

DETAILED DESCRIPTION

Figure 1A:
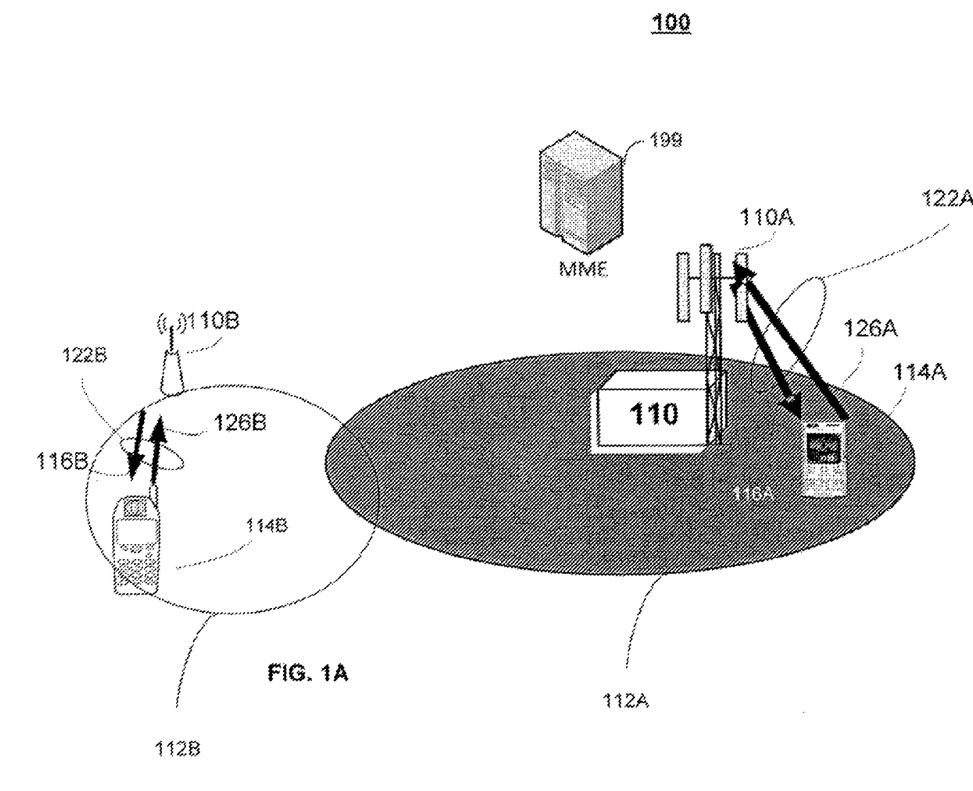
FIG. 1A depicts an example of a system configured, in accordance with some exemplary embodiments.

FIG. 1A depicts a system 100 including a base station 110A, such as an eNB base station, supporting a corresponding coverage area 112A (also referred to as a cell and/or a macro cell). The base station 110A may be capable of communicating with wireless devices, such as user equipment, within its coverage area 112A. System 100 also includes a small cell 112B, such as a picocell, a femtocell, and the like, served by a small cell base station 110B. Examples of small cell base stations include a picocell base station, a femtocell base station, a home base station, and a home E-UTRAN node B base station (HeNB) configured in accordance with standards, such as for example Third Generation Partnership Project (3GPP) Long Term Evolution (LTE). Although LTE is referred to herein, it is merely an example as other standards and technologies may be used as well. The system 100 also depicts an example of a so-called "heterogeneous network" as it includes different types of cells including small cells and macro cells, although the subject matter described herein may be used in other types of networks as well.

In some exemplary embodiments in which there is a heterogeneous network including a mix of macro cells and small cells, the mobility of the user equipment 114B (when it is highly mobile and thus moving at a relatively high rate of speed through one or more cells) may cause a decrease in the quality of service provided to the user equipment 114B. Moreover, the configuration of the user equipment 114B, such as the cell re-selection, hand over, and the like, may not adequately address the highly mobile user equipment. For example, as the user equipment 114B moves quickly through macro cell 112A and into small cell 112B, the hand over to small cell 112B may be delayed due to the inherent delays in carrying out the hand over. Moreover, these delays in the hand over may cause a decrease in the quality of, or interruption in, service provided to the user equipment 114B.

To avoid such decreases or interruptions associated with the service provided in heterogeneous networks including small cells, the subject matter described herein may, in some exemplary embodiments, use a time value assigned specifically to a cell, such that the user equipment delays performing measurements and/or sending a measurement report to the network until after the expiration of the time value. For example, the network may configure the user equipment to implement a certain time value, such as a time-to-trigger value. In addition, the time value may be used by the user equipment when evaluating a cell as a potential candidate for handoff (also referred to as target cell and/or candidate cell). Because the time value, such as time-to-trigger, controls how soon the user equipment performs measurements on the target cell and/or reports those measurements to the network in order to allow the network to determine whether to initiate the hand over to the target cell, a high mobility user equipment traveling rapidly through a small, target cell (which is configured with a relatively long time-to-trigger value) can be configured to delay and thus not send a message reporting measurements on the small, target cell. This delay inhibits the hand over of a fast moving user equipment to a small cell. Indeed, absent the delay, the hand over of a high mobility user equipment in a small cell may result in a temporary loss in service as the user equipment is likely to be out of the coverage area of the small cell after the hand over is initiated or completed. However, a relatively less mobile, slow moving user equipment (which is configured with the same relatively long time-to-trigger value) may linger around the small cell long enough to evaluate the small cell and send, after the time-to-trigger has elapsed, a measurement report to the network to initiate the hand over to the small cell. Although in this case, the hand over of the slow moving user equipment is worthwhile as the slow moving user equipment is still likely to be in the coverage area of the small cell. When the time-to-trigger value is shortened in time and assigned to a macro cell, the user equipment (regardless of whether it is fast or slow moving) reports measurements to the network measurements regarding a target cell in order to prompt a hand over.

Before providing additional description regarding the time values noted above, the following further describes FIG. 1A.

The base station 110A may, in some exemplary embodiments, be implemented as an evolved Node B (eNB) type base station, as noted above. When this is the case, base station 110A may be configured in accordance with standards, including the Long Term Evolution (LTE) standards, such as 3GPP TS 36.201, Evolved Universal Terrestrial Radio Access (E-UTRA); Long Term Evolution (LTE) physical layer; General description, 3GPP TS 36.211, Evolved Universal Terrestrial Radio Access (E-UTRA); Physical channels and modulation, 3GPP TS 36.212, Evolved Universal Terrestrial Radio Access (E-UTRA); Multiplexing and channel coding, 3GPP TS 36.213, Evolved Universal Terrestrial Radio Access (E-UTRA); Physical layer procedures, 3GPP TS 36.214, Evolved Universal Terrestrial Radio Access (E-UTRA); Physical layer—Measurements, and any subsequent additions or revisions to these and other 3GPP series of standards (collectively referred to as LTE standards). Furthermore, although FIG. 1A depicts an example of a configuration for base station 110A, the base station 110A may be configured in other ways as well. For example, the base station 110A may include relays, cellular base station transceiver subsystems, gateways, access points, radio frequency (RF) repeaters, frame repeaters, and remote radio heads and include access to other networks as well. For example, base station 110A may have wired and/or wireless backhaul links to other network elements, such as other access points, base stations, remote radio heads, radio network controllers, core networks, serving gateways, mobility management entities (e.g., mobility management entity 199), and the like.

Small cell base station 110B may, in some exemplary embodiments, be implemented as a picocell base station, a femtocell base station, a home base station, and/or a home E-UTRAN node B base station (HeNB), as noted above. Although some of the examples herein refer to the small cell base station 110B as a femtocell base station, such as a HeNB, the small cell base station 110B may be implemented using other technologies and/or standards as well. Moreover, although FIG. 1A depicts an example of a configuration for the small cell base station 110B, the small cell base station 110B may be configured in other ways. For example, small cell base station 110B may have wired and/or wireless backhaul links to other network nodes, such as a mobility management entity 199, other base stations, a radio network controller, a core network, a serving gateway, and the like. In addition, small cells may be deployed on a different frequency and/or using other radio access technologies than the macro cells.

In some exemplary embodiments, the system 100 may include access links, such as links 122A-B. The access link 122A may include a downlink 116A for transmitting to the user equipment 114A and an uplink 126A for transmitting from user equipment 114A to the base station 110A. The downlink 116A may comprise a modulated radio frequency carrying information, such as user data, radio resource control (RRC) messages, location information, time values, parameters, and the like, to the user equipment 114A, and the uplink 126A may comprise a modulated radio frequency carrying information, such as user data, RRC messages, measurement reports, location information, and the like, from the user equipment 114A to base station 110A. Access links 122B may include downlink 116B for transmitting from the small cell base station 110B to user equipment 114B, and uplink 126B for transmitting from user equipment 114B to the small cell base station 110B.

The downlink 116A and uplinks 126A may, in some exemplary embodiments, each represent a radio frequency (RF) signal. The RF signal may, as noted above, include data, such as voice, video, images, Internet Protocol (IP) packets, control information, and any other type of information and/or messages. For example, when LTE is used, the RF signal may use OFDMA. OFDMA is a multi-user version of orthogonal frequency division multiplexing (OFDM). In OFDMA, multiple access is achieved by assigning, to individual users, groups of subcarriers (also referred to as subchannels or tones). The subcarriers are modulated using BPSK (binary phase shift keying), QPSK (quadrature phase shift keying), or QAM (quadrature amplitude modulation), and carry symbols (also referred to as OFDMA symbols) including data coded using a forward error-correction code. The subject matter described herein is not limited to application to OFDMA systems, LTE, LTE-Advanced, or to the noted standards, specifications, and/or technologies. Furthermore, the downlink 116B and uplink 126B may be configured using standards and/or technologies similar to those noted with respect to downlink 116A and uplink 126A, although downlink 116B and uplink 126B may use a different standards, frequencies, or technologies as well.

In some exemplary embodiments, the user equipment 114A-B may be implemented as a mobile device and/or a stationary device. The user equipment 114A-B are often referred to as, for example, mobile stations, mobile units, subscriber stations, wireless terminals, tablets, smart phones, or the like. A user equipment may be implemented as, for example, a wireless handheld device, a wireless plug-in accessory, or the like. In some cases, user equipment may include a processor, a computer-readable storage medium (e.g., memory, storage, and the like), a radio access mechanism, and/or a user interface. For example, the user equipment may take the form of a wireless telephone, a computer with a wireless connection to a network, or the like.

In some exemplary embodiments, user equipment may be configured to operate in a heterogeneous network (also referred to as a HetNet) including small cells, such as small cell 112B, and macro cells, such as cell 112A. In some implementations configured as a heterogeneous network, the user equipment may access base station 110A, such as an evolved node B base station, serving macro cell 112A, and user equipment may also access small cell base station 110B serving small cell 112B.

Although FIG. 1A depicts two base stations 110A-B, two cells, such as macro cell 112A and small cell 112B, and two-user equipment 114A-B, the system 100 may include other quantities of base stations, cells, and user equipment as well.

Figure 1B:
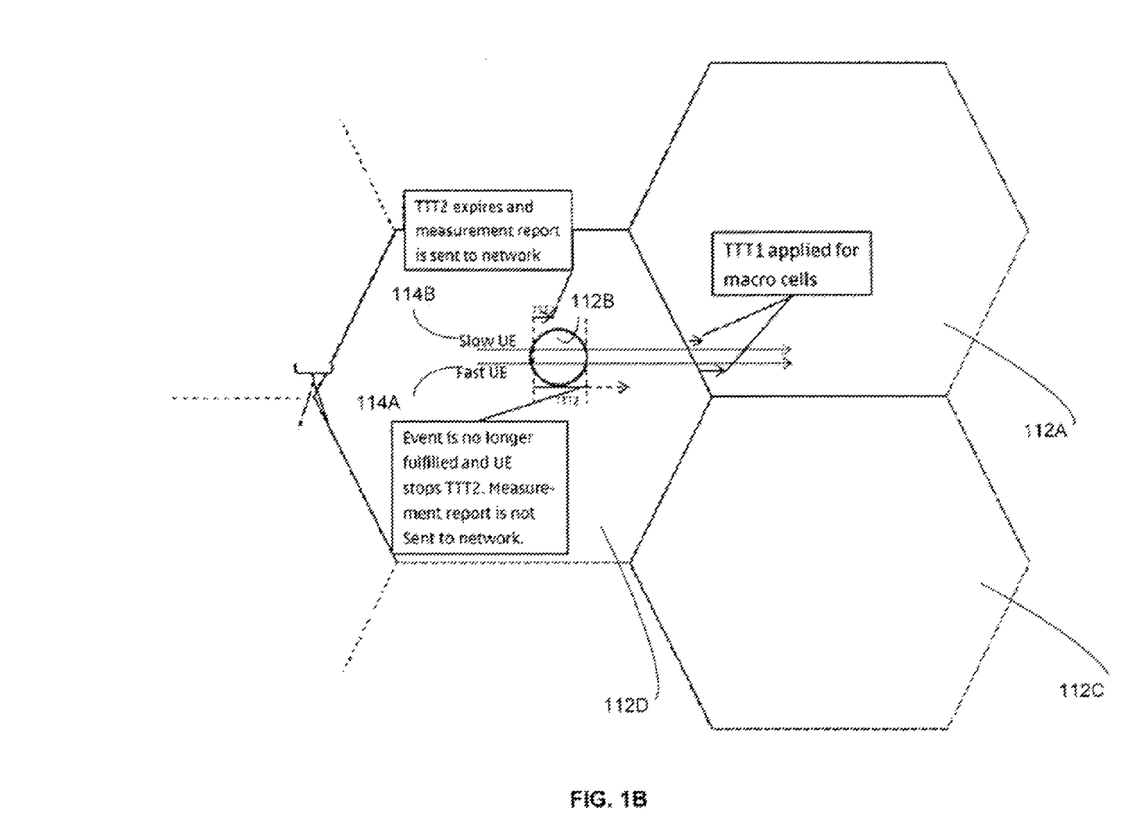
FIG. 1B depicts another example of a system including user equipment configured with time values, in accordance with some exemplary embodiments.

FIG. 1B depicts small cell 112B including user equipment 114A and user equipment 114B. User equipment 114A is, at a given instant in time, moving at a relatively high rate of speed through the coverage area served by small cell 112B, and user equipment 114B is not moving at high mobility or speed (e.g., moving at a speed that is slower than user equipment 114A).

In the example of FIG. 1B, the network, such as a base station, a wireless access point, or other node in the network, may assign small cell 112B with a time-to-trigger value (labeled TTT2) and provide that value, TTT2, to user equipment. The network may also assign another time-to-trigger value (labeled TTT1) to macro cells, such as macro cell 112A and send the other value, TTT1, to the user equipment. Moreover, the time-to-trigger value (TTT2) assigned to the small cell 112B is relatively longer in duration, when compared to the time-to-trigger value (TTT1) assigned to macro cells, such as macro cells 112A, 112C, and 112D. As such, the high mobility user equipment 114A and the other user equipment 114B (which moves at a normal or slower rate) traveling through the small cell 112B are both configured to wait for a relatively long first time value, such as time-to-trigger value (TTT2), before evaluating small cell 112B and sending to the network a measurement report including measurements of small cell 112B. Because of the relatively high speed of the high mobility user equipment 114A and the small size of the small cell 112B, the high mobility user equipment 114A may never send the measurement report because it may be out of coverage of the small cell, and in coverage of another cell, and thus have another measurement report representative of, for example, another cell, such as macro cell 112A. Thus, user equipment 114A may be inhibited from performing a hand over to the small cell 112A. However, after expiration of the time-to-trigger value (TTT2), the relatively slower user equipment 114B may still be in the small cell 112B, and, as such, will be able to send a measurement report to the network, causing a hand over to be initiated for the user equipment 114B to the small cell 112B. This example illustrates how the time value assignment to a specific type of cell, such as a small cell, may be used to inhibit (e.g., disable, prevent, delay, and the like) the hand over of a high mobility user equipment to a small cell. Moreover, the disabling may be implemented without performing a mobility state estimation at the user equipment having a high mobility state.

Although the example of FIG. 1B depicts the macro cells 112A, 112C, and 112D, configured with the same time-to-trigger value, TTT1, the macro cells may each be configured with different time-to-trigger values as well.

In some exemplary embodiments, the network may assign a specific cell(s) or a specific types of cell(s) with one or more time values, such as time-to-trigger values. For example, the network may assign a time-to-trigger value to small cells in order to delay (or inhibit) a hand over of fast moving user equipment to the small cells, such as pico cells, femto cells, and the like. In some exemplary embodiments, the network may configure one or more picocells with a first time-to-trigger (also referred to as TimeToTrigger) value and one or more macro cells with a second, time-to-trigger value. Specifically, the network may send to the user equipment a radio resource control message including the first time-to-trigger value, to be applied by the user equipment when evaluating a pico cell or a femto cell, and send a second time-to-trigger value, to be applied by the user equipment when evaluating a macro cell.

Although some of the examples described herein refer to using time values to inhibit the hand over while the user equipment is in a connected mode to the network, the network may configure each cell with time values for use in cell re-selections performed while the user equipment is in an idle mode. When in an idle mode, the time value may comprise a re-selection time value (e.g., "Treselection") rather than TimeToTrigger values. Moreover, the network may provide to the user equipment the Treselection time values, such that the user equipment is configured to delay cell re-selection until the Treselection value expires, wherein the Treselection thus depends on the cell under evaluation (which may delay the cell re-selection in the case of a fast moving user equipment and a small cell).

Optionally also cell specific hysteresis related to mobility events can be provided to the user equipment as part of mobility parameter signaling and configuration in both connected state and idle state. Moreover, these parameters can be configured in such a way that the different parameters are applied differently depending on the cell under evaluation (e.g., whether it is a macro cell or a small cell).

Referring to FIGS. 1A-1B, the network, such as a base station, MME, or another network element therein, may configure the user equipment 114A and/or 114B with different time values, such as time-to-trigger values, and the like for different types of cells. In the following example, system 100 includes a first time value, TTT1, for macro cells, such as macro cells 112D 112A, and a second time value, TTT2, for the small cells, such as cell 112B. As such, when the user equipment is in macro cell 112D, the user equipment performs measurements and reporting evaluation as configured with the first time value, TTT1, when evaluating other macro cells e.g. 112A. When in the macro cell 112D, the user equipment performs measurements and reporting evaluation as configured with the second time value, TTT2, when evaluating a small cell, such as pico or femto cell 112B. Moreover, the first time value, TTT1, may be configured as a relatively short time value and optimized for macro layer mobility such that on the macro layer, mobility is robust when using the first time value, TTT1. On the other hand, the second time value, TTT2, applied for small cell measurement evaluation and reporting may be configured as a relatively longer time value, resulting thus in a delay in sending a message, such as a measurement report to the network, and also resulting in hand overs being inhibited for high mobility, fast moving user equipment in a small cell. Moreover, this inhibition may, in some exemplary embodiments, be performed without mobility state estimation being determined by the user equipment to determine whether a hand over should be inhibited given a high mobility state.

Applying the relatively longer second time value, TTT2, when performing event evaluation for reporting and/or measuring at a user equipment with regard to a small cell, may cause a fast moving user equipment to experience that the measurement event criteria is not fulfilled sufficiently long enough for the small cell to trigger a measurement report to be transmitted to the network (and thus the hand over will not occur). Moreover, although applying the relatively longer second time value, TTT2, this may likely not cause any significant impact on a slow moving user equipment as it will continue to be under good radio conditions in the small cell and the measurement event may be continuously fulfilled even when TTT2 expires, such that measurement report is sent by the user equipment to the network to trigger a hand over to another cell, such as cell 112B. In these examples, the hand over behavior is with respect to time values, such as TTT1 and TTT2, rather than the user equipment's estimated speed as determined by the mobility state estimation process.

In some exemplary embodiments, the network may provide the user equipment with a relatively longer time value, such as TTT2, to be applied when evaluating a small cell, to minimize the likelihood of hand overs to a small cell in the case of a high mobility and/or speed and/or a moderate (or medium) mobility and/or speed user equipment.

Because mobility state estimation is an optional feature and therefore potentially not used in some networks, the use of cell specific time values for specific cells and/or specific types of cells may be used to compensate for the lack of mobility state estimation in some heterogeneous networks, as the hand over and re-selection of cells may be adjusted based on the cell-specific time values (e.g., relatively longer time values assigned for use towards small cells to essentially inhibit hand over to the small cell), rather than wait for a mobility state estimation determination by the user equipment if mobility state estimation is at all in use/used in the network.

Figure 2:
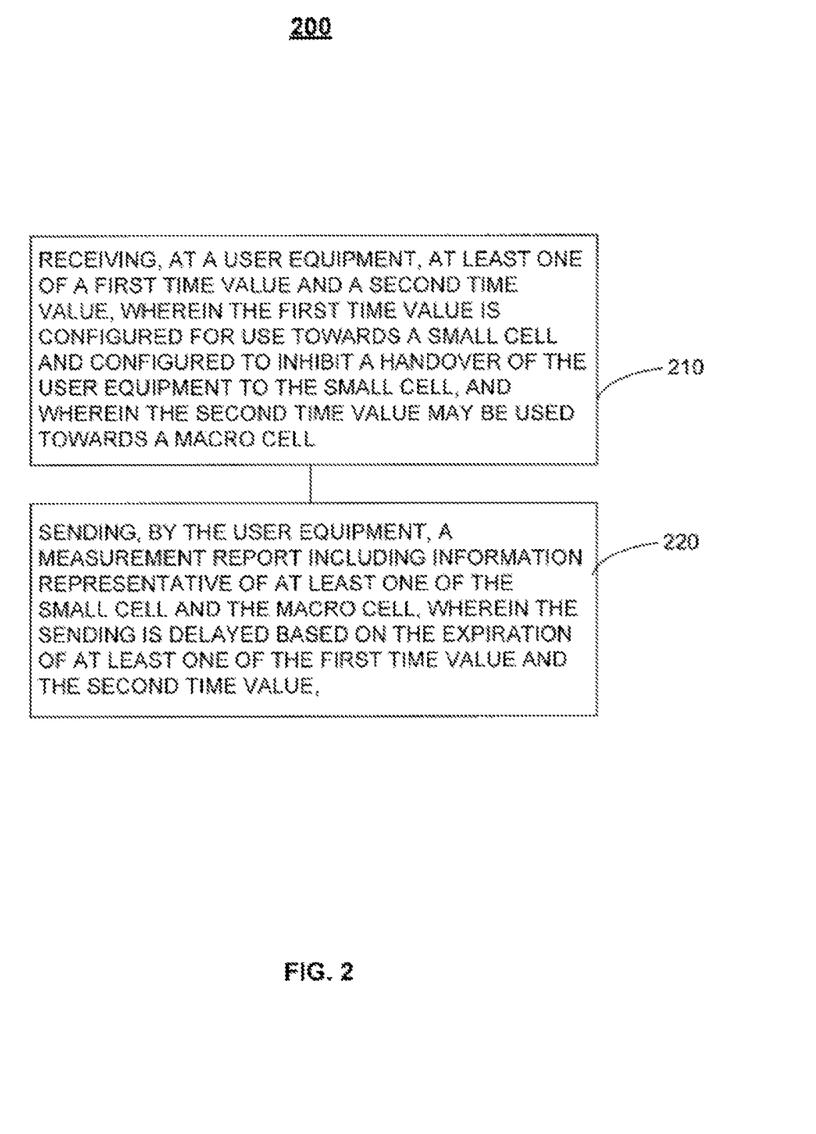
FIG. 2 depicts an example of a process for using time values to inhibit handoffs and cell re-selections in small cells, in accordance with some exemplary embodiments.

FIG. 2 depicts a process 200 implemented at, for example, a user equipment, in accordance with some exemplary embodiments.

At 210, a user equipment may receive, from the network, a first time value for use towards one or more small cells and/or a second time value for use towards one or more other cells, such as a macro cells, in accordance with some exemplary embodiments. The first time value may be configured to delay measurement and/or measurement reporting triggered by a small cell. By delaying the user equipment's measurement of a cell, such as a target cell, and/or measurement reporting of such cell to the network of the measurements, the network may not initiate a hand over of the user equipment to the small cell, when the user equipment is in a high mobility, a high speed, and/or a high velocity and/or a medium mobility, medium speed, and/or a medium velocity. In this case, the network inhibits a hand over of the fast/medium moving user equipment to a small cell as it is likely that the user equipment is no longer in the coverage area of the small cell. Moreover, the inhibition of the hand over of the high mobility user equipment to a small cell may be performed based on the time value, rather than a mobility state estimation.

The time values may be implemented as time-to-trigger values, counter values, and any other mechanism which can cause a delay as described herein.

At 220, the user equipment may send a measurement report for a target cell, such as a small cell or a macro cell, in accordance with some exemplary embodiments. Moreover, the measurement report may not be sent until after the expiration of the time value. For example, if the user equipment is evaluating a small cell, the measurement report is sent after the expiration of the first time value, such as a time-to-trigger value. And, if the user equipment is evaluating a macro cell, the measurement report is sent after the expiration of the second time value. The first time value may be configured to be longer than the second time value, so that high mobility or moderately mobility user equipment may delay sending measurement reports associated with a small cell such that the user equipment no longer will be in the coverage area of the small cell when the timer (e.g., TimeToTrigger expires), inhibiting measurement reporting and thus a hand over to the small cell. Although process 200 is described with respect to a hand over, the process may be applicable as well to cell re-selection in idle mode.

The following description relates to some embodiments in which the network controls and facilities mobility state estimation at the user equipment potentially enhanced by providing a parameter, such as a weight, a count, and the like, to the user equipment for use in scaling values associated with mobility state estimation (MSE) at the user equipment and/or setting the mobility state of the user equipment. The parameter may be used in connection with adjusting the cell re-selections and/or hand overs used to determine whether the user equipment is in a high mobility state, a moderate mobility state, and/or any other state. Some of the embodiments described in the detailed description below may be used in combination with, or separately from, the time values described in the detailed description above.

Mobility state estimation (MSE) may be used to determine the state of the mobility of a user equipment. For example, a user equipment may perform mobility state estimation to determine whether it is highly mobile, moderately mobile, or neither. The determined mobility state may then be used to adjust parameters used for hand over and cell re-selection in, for example, a network, such as a heterogeneous network.

In some exemplary embodiments, the subject matter described herein relates to the network providing a parameter, such as a weight, a value, and the like, to the user equipment. For example, the network (and/or a network element therein) may provide the parameter to control the mobile state estimation determination at the user equipment. For example, the parameter may comprise a weight (see, e.g., "weight" at Equation 1 below) or a value (see, e.g., "number" at Equation 2 below) used to control the mobility state estimation.

To illustrate with an example based on 3GPP TS 36.331, Radio Resource Control Protocol specification, Release 10 (hereinafter TS 36.331), the user equipment may, when in connected mode to the network, receive a parameter from the network and then use that parameter in the mobility state estimation (MSE) determination process. For example, the user equipment may determine the mobility state estimate as a high mobility state, a medium mobility state, and the like. The received parameter (see, e.g., the "weight" in Equation 1 below, and the "number" in Equation 2 below) may be used in the mobility state estimation determination, although the received parameter may also be used to directly set the mobility state to a given state (e.g., high mobility, medium mobility, normal mobility state, and the like).

To further illustrate with an example based on 3GPP TS 36.331, the user equipment may, when in connected mode with the network, receive a parameter from the network and then use the received parameter in the mobility state estimation determination process. The received parameter may be used to indicate a weight of the cell change and use this parameter when determining the mobility state.

For example, if a quantity of cell changes, Nreselection (n), by a user equipment during a given time period, TCRmax, exceeds a threshold value, NCR_M, and does not exceeds another threshold value, NCR_H, then the user equipment may be considered to be in a medium mobility state. And, if the quantity of cell changes, Nreselection(n), during a time period, TCRmax, exceeds a threshold value, NCR_H, then the user equipment may be considered to be in a high mobility state. The received parameter may thus be used to control the quantity of cell changes used in the mobility state estimation in the user equipment by scaling (or adjusting) the value of cell changes, Nreselection(n), used in the mobility state estimation algorithm.

Figure 3:
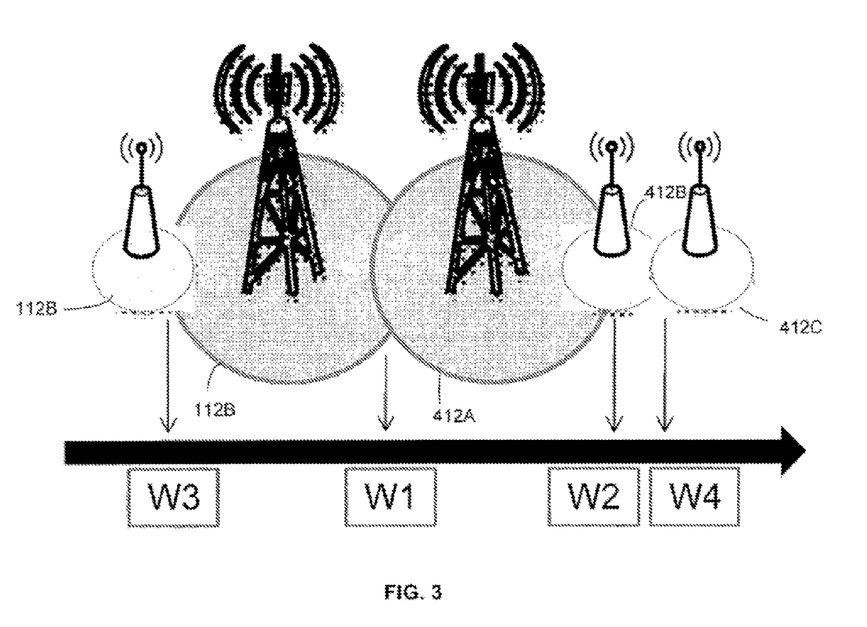
FIG. 3 depicts an example of a system configured to provide parameters to a user equipment to control aspects of mobility state estimation at the user equipment, in accordance with some exemplary embodiments.

In some exemplary embodiments, one or more cells may be configured with different parameters, as depicted in FIG. 3. FIG. 3 depicts an example of a heterogeneous network 400 including small cells 112B, 412B, and 412C and macro cells 112B and 412A. In the example of network 400, each of the cells 1126, 412B, and 412C and macro cells 112 6 and 412A provides a parameter (e.g., W1, W2, W3, or W4), to corresponding user equipment in the coverage area of the cells. In this exemplary embodiment, the network controls, or assists, in the mobility state estimation at the user equipment by providing the parameter (e.g., a weight, a value, and the like), which either scales the values used in mobility state estimation (e.g., changes the value of cell changes, Nreselection(n)) or sets (or, e.g., resets) the mobile state of a user equipment in a given cell. In some exemplary embodiments, the network (e.g., a base station, wireless access point, and the like serving a cell) may send the parameter, such as a weight, to the user equipment in a message, such a radio resource control message (RRC), although other mechanisms may be used to send the parameter as well.

In some exemplary embodiments, the user equipment may receive from the network a parameter for use in the determination of mobility state. Next, the user equipment may then adjust the cell change values when determining mobility state estimation. The user equipment may determine the cell change (e.g., reselection and/or hand over) value (also referred to as a weight) according to the following equation:

$$Nreselection(n) = Nreselection(n-1) + weight^{*}count \quad \text{(Equation 1);}$$

wherein Nreselection(n) represents the accumulated value of the cell re-selections or hand overs during a given time period, which is used in the determination of mobility state by an idle or connected mode user equipment. Nreselection (n−1) represents the prior value of the cell changes (reselections or hand overs), weight represents the parameter provided by the network to assist or control the mobility state estimation, and count represents, in this example, a counting value of '1' but could also be other values as well.

The user equipment may also scale its cell changes according to the following equation:

$$Nreselection(n) = Nreselection(n-1) + number \quad \text{(Equation 2);}$$

wherein Nreselection(n) represents the accumulated value of the cell changes (reselections or hand overs) during a given time period (window) which is to be used in the determination of mobility state, Nreselection(n−1) represents a prior (e.g., accumulated) value of the cell changes taken over same given time period or window, and number represents the parameter provided by the network to assist or control the mobility state estimation.

In some exemplary embodiments, the parameter sent by the network to the user equipment may be sent in a broadcast message, such as a radio resource control (RRC) message, a hand over message, a RRCConnectionReconfiguration message, and the like. Moreover, the parameter may be linked to specific types of cells. For example, Table 1 below shows an example of the parameter sent by the network to the user equipment and is based on the cell types involved in the hand over, such as pico cell, macro cell, and the like. By including the parameter (which may depend both on the former serving cell type and the target cell type) in the hand over signaling, it allows the network to control the mobility state estimation process at the user equipment. This approach may, in some implementations, move the complexity and computational burden from the user equipment to the network, remove the need for complex rules at the user equipment, remove the need for some signaling overhead, and/or allow the network to control the parameters associated with the mobility state estimation on the fly.

In some exemplary embodiments, the parameter may be sent as the actual parameter, such as those listed below in Table 1, or as a bit sequence that maps to the actual parameter value.

Table 1 depicts an example of the parameters that may be sent by the network to the user equipment under a variety of conditions. As noted, the parameters may represent either as a weight(s) to be used in the mobility state estimation algorithm or as an actual value (e.g., count, number, etc.) that the user equipment implements as an incremental value in the mobility state estimation value, although other variations are possible as well. To illustrate further, when the hand over is from a macro cell to another macro cell, the network may send a parameter (labeled "weight" of "1") to represent no change to the scaling of the of the 'count' value (e.g., assumed to be '1' in this example) in the mobility state estimation process (also referred to as an algorithm or procedure) at the user equipment. However, when the hand over is from a macro cell to a small cell, such as a picocell, the network may send a parameter of 0.45 to represent some scaling of the mobility state estimation process at the user equipment. Moreover, when the hand over is from a small cell (e.g., picocell) to a macro cell, the network may send a parameter of 0.25 to represent a more substantial scaling of the mobility state estimation process at the user equipment. In addition, when the hand over is from a small cell to another small cell, the network may send a weight of 0 to represents that the incremental value of the cell change used in the mobility state estimation is '0' as the indicated weight is '0'. The values in Table 1 are merely exemplary as other values may be used as well. Although the parameters of Table 1 are depicted as cell-type dependent, the parameters may be configured to a given cell based on other factors as well and may be assigned with little, or no, regard to cell-type (e.g., whether the cell is a small cell, macro cell, and the like). Moreover, the parameter sent by the network to the user equipment may also be used to directly signal and thus control a specific mobility state in the user equipment (e.g., whether the user equipment is in a high, medium, or other mobility state).

TABLE 1

| Hand over type | Weight |
| --- | --- |
| Macro-macro | 1 |
| Macro-Pico | 0.45 |
| Pico-Macro | 0.25 |
| Pico-Pico | 0 |

In some exemplary embodiments, when the network sends to the user equipment a parameter, the parameter comprises a count (or number) to be added to the cell change value used in the mobility state estimation determination. As such, the network can effectively command the user equipment to use the given cell change valuen in the mobility state estimation process or to directly control the mobility state estimation state.

In some exemplary embodiments, the network may pre-configure the user equipment to a given mobility state by sending the parameter. For example, the network may send a parameter to configure the user equipment to start in medium (also referred to as moderate) mobility state rather than a normal state.

Table 2 depicts an example of a parameter (labeled "Scaling Weight") sent from the network to the user equipment. The user equipment uses the factors of Table 2 to scale a mobility control related value, when the user equipment is in medium or high-speed state. The factor sf-Medium represents the speed scaling factor to be used by the user equipment when in the medium mobility state. The specified mobility control related values are multiplied by the value of sf-Medium when the user equipment is in a medium mobility state as defined in for example TS 36.331. The factor sf-High represents the speed scaling factor to be used by the UE when in high mobility state. The specified mobility control related values are then multiplied by the value of sf-high when the user equipment is in a high mobility state as defined in for example TS 36.331. The ScalingWeight represents the parameter, such as a weight, provided by the network and applied to the mobility state estimation to calculate the mobility state. For example, the user equipment may apply the ScalingWeight during a cell change count.

TABLE 2

| SpeedStateScaleFactors information element |
| --- |
| -- ASN1START<br>SpeedStateScaleFactors ::= SEQUENCE {<br>  sf-Medium            ENUMERATED<br>                                  {oDot25, oDot5, oDot75, lDot0},<br>  sf-High                ENUMERATED<br>                                  {oDot25, oDot5, oDot75, lDot0},<br>  ScalingWeight     ENUMERATED<br>                                  {Weight1, Weight2, ... ., Weightx}<br>}<br>-- ASN1STOP |

Figure 4:
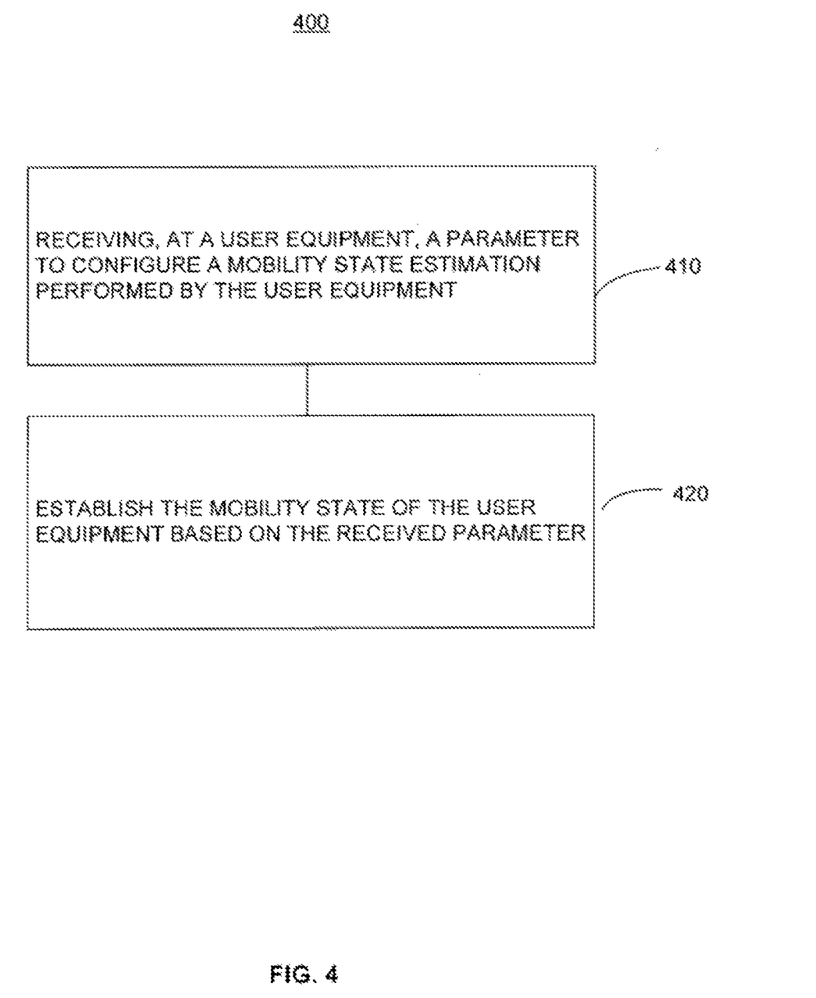
FIG. 4 depicts an example of a process for providing parameters to a user equipment to control aspects of mobility state estimation at the user equipment, in accordance with some exemplary embodiments.

FIG. 4 depicts a process which may be implemented at user equipment in accordance with some exemplary embodiments.

At 410, a user equipment may receive, from the network, a parameter to configure the mobility state estimation performed by the user equipment, in accordance with some exemplary embodiments. For example, the parameter may comprise a weight, a count, and any other value. In some exemplary embodiments, the received parameter may comprise the weight as depicted in Equation 1 above. In some exemplary embodiments, the parameter may comprise the "number" depicted in Equation 2 above. In any case, the received parameter changes the quantity of cell selections used in the mobility state estimation algorithm performed at the user equipment. As such, the network, such as a base station, wireless access point, and other node in the network, may send the parameter to the user equipment to control and/or assist in the mobility state estimation process performed at the user equipment.

At 420, the user equipment may establish a mobility state for the user equipment based on the received parameter, in accordance with some exemplary embodiments. For example, the user equipment may, based on the received parameter determine a quantity of cell selections, and then use the quantity of cell reselections to determine, or estimate, the mobility state of the user equipment. To illustrate, the network may send the parameter that the user equipment shall use in, for example, Equations 1 and 2 above to determine the cell selection value used when performing mobility state estimation. Based on the outcome of the mobility state estimation algorithm performed at the user equipment (e.g., normal, medium or high), the user equipment then scales the defined mobility parameters according to the scaling instructions in Table 2 (e.g., sf_medium, sf_high, and the like). In Table 2, the "weight" is signaled from the network to the user equipment for use in the mobility state algorithm including, for example, Equations 1 and 2 above.

Figure 5:
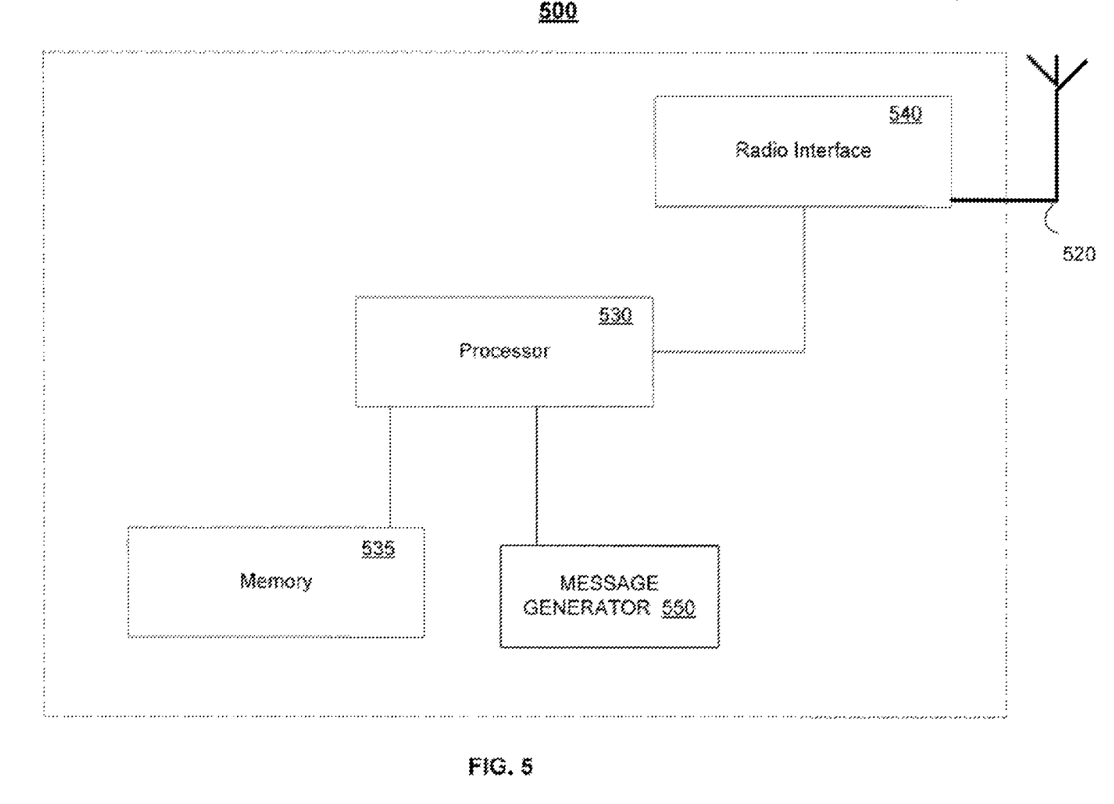
FIG. 5 depicts an example of a base station, in accordance with some exemplary embodiments.

FIG. 5 depicts an example implementation of a base station 500, which may be implemented at base station 110A and/or small cell base station 110B. The base station may include one or more antennas 520 configured to transmit via a downlink and configured to receive uplinks via the antenna(s) 520. The base station may further include a radio interface 540 coupled to the antenna 520, a processor 530 for controlling the base station 500 and for accessing and executing program code stored in memory 535. The radio interface 540 may further include other components, such as filters, converters (e.g., digital-to-analog converters and the like), mappers, a Fast Fourier Transform (FFT) module, and the like, to generate symbols for a transmission via one or more downlinks and to receive symbols (e.g., via an uplink). In some implementations, the base station may also be compatible with IEEE 802.16, LTE, LTE-Advanced, and the like, and the RF signals of downlinks and uplinks are configured as an OFDMA signal. The base station may include a message generator for providing the time values and parameters described herein.

Figure 6:
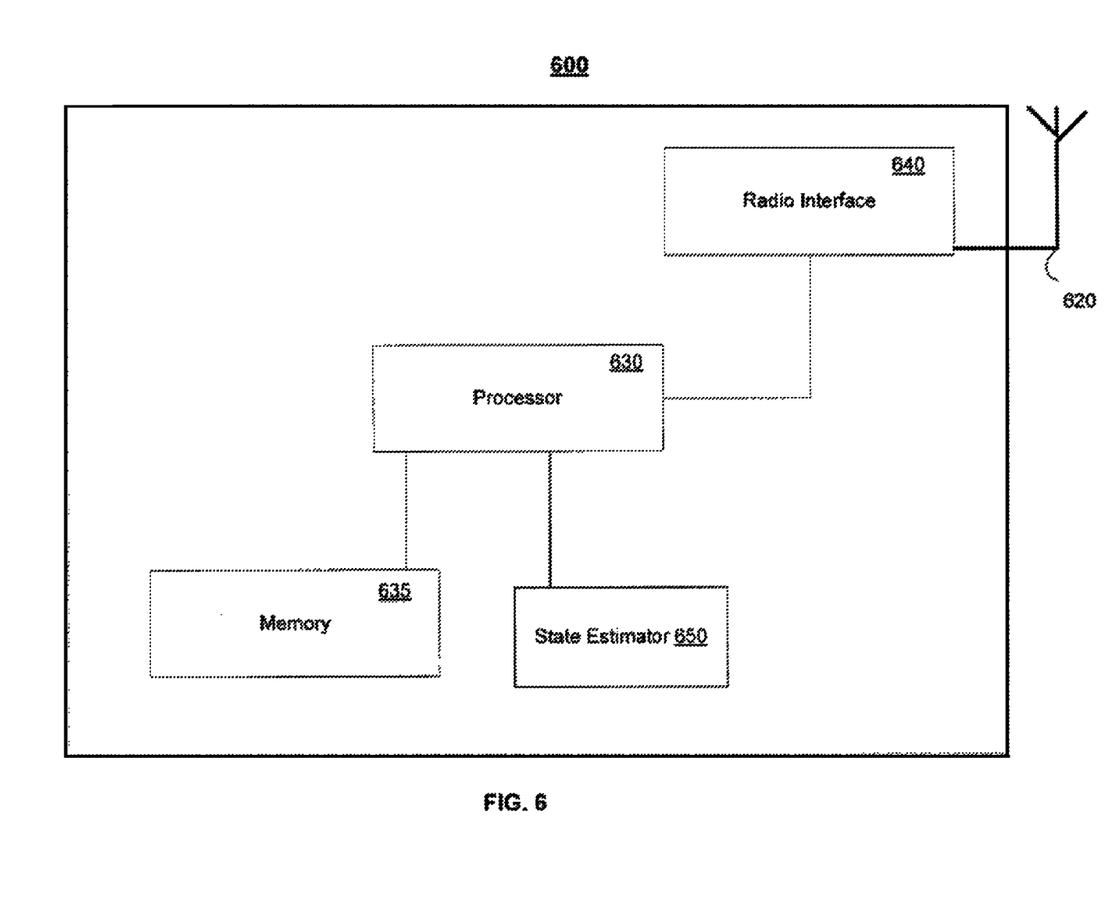
FIG. 6 depicts an example of a user equipment, in accordance with some exemplary embodiments.

FIG. 6 depicts a block diagram of a radio, such as a user equipment 600. The user equipment 600 may include an antenna 620 for receiving a downlink and transmitting via an uplink. The user equipment 600 may also include a radio interface 640, which may include other components, such as filters, converters (e.g., digital-to-analog converters and the like), symbol demappers, signal shaping components, an Inverse Fast Fourier Transform (IFFT) module, and the like, to process symbols, such as OFDMA symbols, carried by a downlink or an uplink. In some implementations, the user equipment 600 may also be compatible with WiFi, Bluetooth, GERAN, UTRAN, E-UTRAN, and/or other standards and specifications as well. The user equipment 600 may further include at least one processor, such as processor 630, for controlling user equipment 600 and for accessing and executing program code stored in memory 635. The user equipment may include a state estimator 650. In some exemplary embodiments, the state estimator 650 may perform one or more of the operations described herein with respect to user equipment.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (e.g., magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. For example, although the change in search pattern is described with respect to small cell base station 110B, other types of base stations and access points may change search modes as described herein. Moreover, the implementations described above may be directed to various combinations and sub-combinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed:

1. A method comprising:
    receiving, at a user equipment, at least one of a first time value and a second time value, the first time value being configured for use towards a first cell and configured to have a duration to inhibit a hand over of the user equipment to the first cell, the second time value being configured for use towards a second cell, wherein the second time value may be one or more of a time-to-trigger, a reselection or a counter; and
    sending, by the user equipment, a measurement report including information representative of at least one of the first cell and the second cell, the sending being delayed by the first time value, when the user equipment is evaluating the first cell, and by the second time value, when the user equipment is evaluating the second cell.

2. The method of claim 1, wherein the first time value represents a duration different from another duration of the second time value.

3. The method of claim 1, wherein the first time value is configured for use towards the first cell, when measuring the first cell as a target for the hand over.

4. The method of claim 1, wherein the first cell comprises at least one of a femto cell and a pico cell.

5. The method of claim 1, wherein the second cell comprises a macro cell served by a base station.

6. The method of claim 1, wherein first time value and the second time value represent time to trigger values.

7. An apparatus comprising:
    at least one processor; and
    at least one memory including code, which when executed by the at least one processor causes operations comprising:
    receiving, at the apparatus, at least one of a first time value and a second time value, the first time value being configured for use towards a first cell and configured to have a duration to inhibit a hand over of the apparatus to the first cell, the second time value being configured for use towards a second cell, wherein the second time value may be one or more of a time-to-trigger, a reselection or a counter; and
    sending, by the apparatus, a measurement report including information representative of at least one of the first cell and the second cell, the sending being delayed by the first time value, when the apparatus is evaluating the first cell, and by the second time value, when the apparatus is evaluating the second cell.

8. The apparatus of claim 7, wherein the first time value represents a duration different from another duration of the second time value.

9. The apparatus of claim 7, wherein the first time value is configured for use towards the first cell, when measuring the first cell as a target for the hand over.

10. The apparatus of claim 7, wherein the first cell comprises at least one of a femto cell and a pico cell.

11. The apparatus of claim 7, wherein the second cell comprises a macro cell served by a base station.

12. The apparatus of claim 7, wherein first time value and the second time value represent time to trigger values.

13. An apparatus comprising:
   at least one processor; and
   at least one memory including code, which when executed by the at least one processor causes operations comprising:
   assigning a first time value to one or more first cells; and
   assigning a second time value to one or more second cells; and
   sending, to a user equipment, the first time value being configured for use towards the one or more first cells and configured to have a duration to inhibit a hand over of the user equipment to the one or more first cells, the second time value being configured for use towards the second cell, wherein the second time value may be one or more of a time-to-trigger, a reselection or a counter.

14. The apparatus of claim 13, wherein the first time value represents a duration different from another duration of the second time value.

15. The apparatus of claim 13, wherein the first time value is configured for use towards the one or more first cells, when measuring the one or more first cells as a target for the hand over.

16. The apparatus of claim 13, wherein the one or more first cells comprise at least one of a femto cell and a pico cell.

17. The apparatus of claim 13, wherein the second cell comprises a macro cell served by a base station.

18. The apparatus of claim 13, wherein first time value and the second time value represent time to trigger values.

\* \* \* \* \*